United States Patent
Bai et al.

(10) Patent No.: US 8,670,386 B2
(45) Date of Patent: Mar. 11, 2014

(54) METHOD, SYSTEM, AND DEVICE FOR IMPLEMENTING TRANSMISSION OF BACKHAUL LINK CONTROL CHANNEL IN RELAY SYSTEM

(75) Inventors: Wei Bai, Beijing (CN); Bingyu Qu, Rolling Meadows, IL (US); Sha Ma, Beijing (CN); Wei Jin, Beijing (CN); Yang Li, Beijing (CN); Wei Zhang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 74 days.

(21) Appl. No.: 13/335,999

(22) Filed: Dec. 23, 2011

(65) Prior Publication Data

US 2012/0093059 A1    Apr. 19, 2012

Related U.S. Application Data

(63) Continuation of application No. PCT/CN2010/074214, filed on Jun. 22, 2010.

(30) Foreign Application Priority Data

Jun. 23, 2009 (CN) .......................... 2009 1 0139708

(51) Int. Cl.
 *H04W 4/00* (2009.01)
(52) U.S. Cl.
 USPC ........................................ 370/328; 370/310.2
(58) Field of Classification Search
 USPC .............. 370/310.2, 315, 322, 328, 348, 501; 455/11.1, 13.1
 See application file for complete search history.

(56) References Cited

U.S. PATENT DOCUMENTS

| | | | |
|---|---|---|---|
| 2002/0065094 A1 | 5/2002 | Schmutz et al. | |
| 2008/0186858 A1 | 8/2008 | Jalil et al. | |
| 2010/0214972 A1* | 8/2010 | Che et al. ...................... | 370/315 |
| 2012/0113884 A1* | 5/2012 | Park et al. ..................... | 370/312 |

FOREIGN PATENT DOCUMENTS

| | | |
|---|---|---|
| CN | 101106794 A | 1/2008 |
| CN | 101132204 A | 2/2008 |
| CN | 101132564 A | 2/2008 |
| CN | 102301770 A | 12/2011 |
| EP | 2372927 A2 | 10/2011 |

OTHER PUBLICATIONS

First Chinese Office Action of Chinese Application No. 201080003769.9 mailed Jan. 24, 2013, 18 pages. (Partial Translation).

(Continued)

*Primary Examiner* — Ricky Ngo
*Assistant Examiner* — Kabir Jahangir
(74) *Attorney, Agent, or Firm* — Slater & Matsil, L.L.P.

(57) ABSTRACT

The present invention discloses a method which includes: allocating, by an eNodeB, a dedicated resource region for a relay served by the eNodeB; calculating, by the eNodeB, a control channel of the relay; configuring, by the eNodeB according to the resource region allocated for the relay and the acquired control channel of the relay, the control channel of the relay in the resource region corresponding to the relay; and detecting, by the relay, control information sent by the eNodeB in the corresponding resource region allocated by the eNodeB for the relay. The present invention solves the transmission problem of a backhaul link control channel in an LTE-A relay system, so that a relay can receive control information sent by the eNodeB within a wider scope and that the complexity of blind detection of the relay is decreased.

21 Claims, 6 Drawing Sheets

(56) References Cited

OTHER PUBLICATIONS

Catt, "Design of Backhaul Control Channel for Type 1 Relay in LTE-A," 3GPP TSG RAN WG1 #57, R1-091990, San Francisco, California, May 4-8, 2009, 4 pages.
European Search Report received in European Application No. 10791527.4-2412, mailed Apr. 23, 2012, 10 pages.
Huawei, "Downlink Performance Evaluation of Type 1 Relay," 3GPP TSG RAN WG1 #57, R1-091808, San Francisco, California, May 4-8, 2009, 6 pages.
International Search Report and translation received in Patent Cooperation Treaty Application No. PCT/CN2010/074214, mailed Sep. 16, 2010, 10 pages.
LG Electronics, "Consideration on Resource Allocation for Relay Backhaul Link," 3GPP TSG RAN WG1 #56, R1-090790, Athens, Greece, Feb. 9-13, 2009, 6 pages.
LG Electronics, "Resource Allocation and Downlink Control Channel Structure for Relay Backhaul Link," 3GPP TSG RAN WG1 #57, R1-092115, San Francisco, California, May 4-8, 2009, 8 pages.
Motorola, "Optimization of Resource Assignment for Uplink Backhaul," 3GPP TSG RAN WG1 #57, R1-092169, San Francisco, California, May 4-8, 2009, 4 pages.
Nokia, et al., "Text Proposal on Backhaul Resource Assignment," 3GPP TSG RAN WG1 #57, R1-092249, San Francisco, California, May 4-8, 2009, 1 page.
Nokia Siemens Networks, et al., "Control Channel for Relay Backhaul Link," 3GPP TSG RAN WG1 #57, R1-091763, San Francisco, California, May 4-8, 2009, 4 pages.
Nortel, "Discussion Paper on the Control Channel and Data Channel Optimization for Relay Link," 3GPP TSG RAN WG1 #56bis, R1-091384, Seoul, Korea, Mar. 23-27, 2009, 10 pages.
Samsung, "Discussion on Backhaul Control Design for Type-1 L3 Relay," 3GPP TSN RAN WG1 #57, R1-091871, San Francisco, California, May 4-8, 2009, 6 pages.
3rd Generation Partnership Project, "Technical Specification Group Access Network; Further Advancements for E-UTRA Physical Layer Aspects (Release 9),"3GPP TR 36.814, v. 4.1, Feb. 2009, 31 pages.
Written Opinion of the International Searching Authority and translation received in Patent Cooperation Treaty Application No. PCT/CN2010/074214, mailed Sep. 16, 2010, 8 pages.
European Office Action received on Application No. 10791527.4-1854, Applicant: Huawei Technologies Co., Ltd., mailed Jun. 5, 2013, 10 pages.
Australian Office Action received on Application No. 2010265387, Applicant: Huawei Technologies Co., Ltd., mailed May 21, 2013, 3 pages.

\* cited by examiner

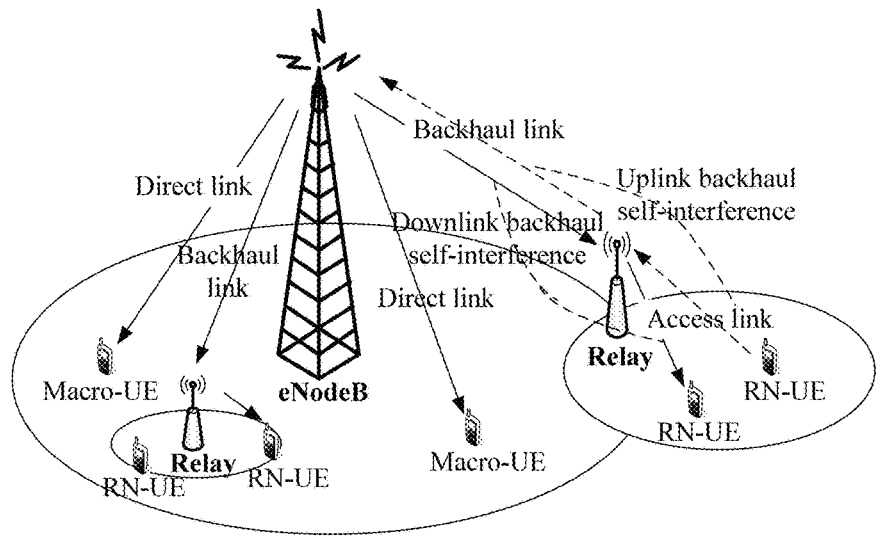

FIG. 1

At the initial configuration stage, a configuration of initial information of a backhaul link control channel is completed between an eNodeB and each relay served by the eNodeB — S1

At the normal communication stage, the eNodeB and the relay perform transmission and updating of the backhaul link control channel information through an dedicated control channel resource region allocated for the each relay. — S2

FIG. 2

METHOD, SYSTEM, AND DEVICE FOR IMPLEMENTING TRANSMISSION OF BACKHAUL LINK CONTROL CHANNEL IN RELAY SYSTEM

CROSS-REFERENCE TO RELATED APPLICATIONS

This application is a continuation of International Application No. PCT/CN2010/074214, filed on Jun. 22, 2010, which claims priority to Chinese Patent Application No. 200910139708.4, filed on Jun. 23, 2009, both of which are hereby incorporated by reference in their entireties.

FIELD OF THE INVENTION

The present invention relates to the field of communication technologies, and in particular, to a method, a system, and a device for implementing transmission of a backhaul link control channel in a relay system.

BACKGROUND OF THE INVENTION

In an LTE (Long Term Evolution-Advanced, long term evolution)—Advanced (LTE-A for short) system, a relay (Relay) is introduced between an eNodeB and a cell, so as to implement the expansion of cell coverage, improve throughput of a cell edge and enhance data transmission capability of a hot pot, thereby enriching the user experience of the LTE/LTE-A system.

In first several OFDM (Orthogonal Frequency Division Multiplexing, orthogonal frequency division multiplexing) symbols of an MBSFN (Multicast Broadcast Single Frequency Network, multicast broadcast single frequency network) subframe, the eNodeB sends a downlink control channel (such as a PCFICH (Physical Control Format Indicator Channel, physical control format indicator channel), a PDCCH (Physical Downlink Control Channel, physical downlink control channel), or a PHICH (Physical Hybrid ARQ Indicator Channel, physical HARQ indicator channel) to a UE, and in subsequent several OFDM symbols, the eNodeB sends control information to a relay in a predefined common resource region, where the common region is formed by several resource elements in multiple PRB (Physical Resource Blocks, physical resource blocks). The PRB region stores time-frequency resources used by all relays, and the eNodeB maps data information that is sent to the UE and the relay to respective positions.

In a mobile communication system, because a radio channel between different relays and the eNodeB vary greatly, in a position of an optimum common resource region that is compromised among all relays and occupies limited time-frequency resources, reception of each relay control signal cannot be optimized, which easily results in small coverage of an eNodeB cell, and therefore, relays at edges of the eNodeB cell or under other adverse channel conditions cannot be effectively supported. Furthermore, because all relays need to judge, through blind detection in the common region, whether any control information is sent to the relays, the calculation burden and complexity are increased.

SUMMARY OF THE INVENTION

An objective of the present invention is to solve the transmission problem of a backhaul link control channel in an LTE-A relay system, so that the reception by a relay of a control signal is optimized and that the complexity of blind detection of the relay is decreased.

Embodiments of the present invention provide a method, a system, and a device for implementing transmission of a backhaul link control channel in a relay system. The technical solutions are as follows.

A method for implementing transmission of a backhaul link control channel in a relay system includes an initial configuration stage and a normal communication stage, where:

at the initial configuration stage, a configuration of initial information of a backhaul link control channel is completed between an eNodeB and each relay served by the eNodeB; and at the normal communication stage, the eNodeB and the relay perform transmission and updating of the backhaul link control channel through a dedicated control channel resource region allocated for each relay.

An eNodeB for implementing transmission of a backhaul link control channel in a relay system includes:

a configuring module, configured to complete, at an initial configuration stage, a configuration of initial information of a backhaul link control channel between the eNodeB and each relay served by the eNodeB; and a transmitting module, configured to perform, at a normal communication stage, transmission and updating of the backhaul link control channel with the relay through a dedicated control channel resource region allocated for each relay.

A relay for implementing transmission of a backhaul link control channel in a relay system includes:

a configuring module, configured to complete, at an initial configuration stage, a configuration of initial information of a backhaul link control channel with an eNodeB; and a transmitting module, configured to perform, at a normal communication stage, transmission and updating of the backhaul link control channel with the eNodeB through a dedicated control channel resource region allocated by the eNodeB for each relay.

A system for implementing transmission of a backhaul link control channel in a relay system includes an eNodeB and relays, where:

the eNodeB is configured to complete, at an initial configuration stage, an configuration of initial information of a backhaul link control channel with each relay served by the eNodeB; and at a normal communication stage, perform transmission and updating of the backhaul link control channel with the relay through a dedicated control channel resource region allocated for each relay; and the relays are configured to complete, at the initial configuration stage, the configuration of the initial information of the backhaul link control channel with the eNodeB; and at the normal communication stage, perform the transmission and updating of the backhaul link control channel with the eNodeB through the dedicated control channel resource region allocated by the eNodeB for each relay.

By allocating dedicated resource regions for the relays served by the eNodeB and thus according to the resource regions allocated for the relays, the eNodeB configures the control channels of the relays in the resources elements of the resource regions corresponding to the relays, which solves the transmission problem of a backhaul link control channel in an LTE-A relay system, so that the reception by a relay of a control signal is optimized and that the complexity of blind detection of the relay is decreased.

BRIEF DESCRIPTION OF THE DRAWINGS

To make the technical solutions in the embodiments of the present invention or in the prior art clearer, the accompanying drawings for describing the embodiments or the prior art are briefly introduced in the following. Apparently, the accompanying drawings in the following description are merely some embodiments of the present invention, and persons of ordinary skill in the art may further obtain other drawings according to these drawings without creative efforts.

FIG. 1 is a basic block diagram of an LTE-A relay system according to an Embodiment 1 of the present invention;

FIG. 2 is a schematic flow chart of a method for implementing transmission of a backhaul link control channel in a relay system according to an Embodiment 1 of the present invention;

DETAILED DESCRIPTION OF THE EMBODIMENTS

Figure 3:
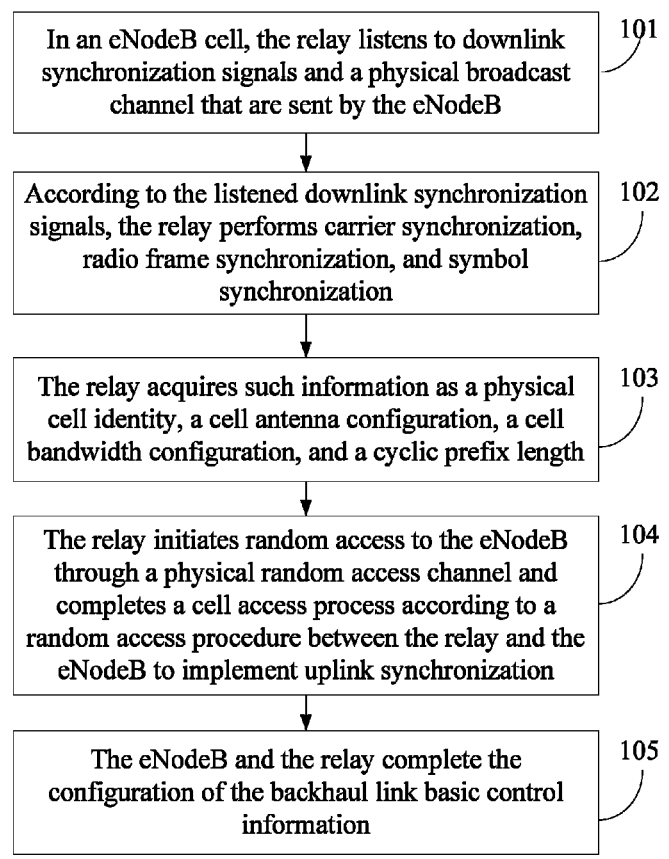
FIG. 3 is a schematic flow chart of an initial configuration stage of a method for implementing transmission of a backhaul link control channel in a relay system according to an Embodiment 2 of the present invention.

To make the objectives, the technical solutions, and the advantages of the present invention clearer, the embodiments of the present invention are further described in detail below with reference to the accompanying drawings. Apparently, the embodiments to be described are merely a part rather than all of embodiments of the present invention. All other embodiments obtained by persons of ordinary skill in the art based on the embodiments of the present invention without creative efforts fall within the protection scope of the present invention.

In order to describe the method provided by the embodiment of the present invention in detail, reference is made to the following embodiment:

Embodiment 1

FIG. 1 is a basic block diagram of an LTE-A relay system according to an embodiment of the present invention. As shown in FIG. 1, a Macro-UE and an eNodeB (eNodeB) establish transmission through a direct link; a RN-UE and a relay (Relay) establish transmission through an access link; and the relay and the eNodeB establish transmission through a backhaul link. In order to avoid backhaul self-interference of the relay, in the LTE-A relay system, the backhaul link and the access link perform time division multiplexing through an MBSFN subframe. In the first one or two OFDM symbols of the MBSFN subframe, the relay needs to deliver control information and a reference symbol to the RN-UE, which may cause that the relay cannot receive a downlink control channel sent by the eNodeB. Therefore, it is required to design a control channel of the backhaul link for receiving the control information sent by the eNodeB to the relay. When solving the design problem of a backhaul link control channel in a relay system, the inventor fully considers the following factors:

(1) from the perspective of backward compatibility with an R8 (LTE Release 8) UE, in the MBSFN subframe of the relay, the eNodeB should be allowed to perform information transmission with the relay and an LTE R8 Macro-UE simultaneously, so the impact of a resource allocation mode of a conventional R8 system on the design must be considered;

(2) the control channel should have good performance and can cover a relatively long distance, so that the relay at the cell edge may also normally receive control information of backhaul link, for example, some link adaptive technologies, power control technologies, and high-performance coding and decoding technologies may be used;

(3) the control channel should consume fewer system resources to reserve more resources for the data channel and improve the data channel throughput of the backhaul link, thereby improving the overall throughput of the system (referring to R1-091805);

(4) for the designed control channel, it should be possible for the relay to use a less complex detection algorithm to quickly and accurately acquire the control channel; and (5) the impact of the special characteristics of the channel between the eNodeB and the relay on the design of the backhaul link control channel is considered: (I) the number of relays in a macro cell of the eNodeB is limited, and currently the number is generally considered to be 1, 2, 4 or 10; (II) as compared with a general UE, the position of the relay is fixed, and the channel conditions between the eNodeB and the relay are static or semi-static for a very long time; and (III) the resource allocation mode of the data channel is semi-static or semi-persistent.

Considering the above factors, an embodiment of the present invention provides a method for implementing transmission of a backhaul link control channel in a relay system, which includes an initial configuration stage and a normal communication stage. As shown in FIG. 2, the method includes the following contents.

S1: At the initial configuration stage, a configuration of initial information of a backhaul link control channel is completed between an eNodeB and each relay served by the eNodeB.

S2: At the normal communication stage, the eNodeB and the relay perform transmission and updating of the backhaul link control channel through a dedicated control channel resource region allocated for each relay.

At the initial configuration stage, the eNodeB sends a PDSCH (Physical Downlink Shared Channel, physical downlink shared channel) to each relay, where the physical downlink shared channel is used for bearing the initial information of the backhaul link control channel that is sent to each relay.

The initial information of the backhaul link control channel includes:

configuration information of a multicast broadcast single frequency network MBSFN subframe used by the relay;

a relay physical cell identity used by the relay; and information of the dedicated control channel resource region used by the relay.

The method includes:

at the initial configuration stage, allocating, by the eNodeB, the relay physical cell identity for the relay, where the relay physical cell identity is used for uniquely identifying the relay; and the control channel resource region and the relay physical cell identity have a mapping relationship; and notifying, by the eNodeB, the relay of the allocated relay physical cell identity and the information of the allocated dedicated control channel resource region, so that the relay searches for the corresponding control channel resource region according to the relay physical cell identity.

The relay physical cell identity comprising:

the relay physical cell identity is used for uniquely identifying each relay served by the eNodeB;

it is inferred, according to the relay physical cell identity of the relay, that the time-frequency resource position of the reference signal transmitted by the relay is different from the frequency domain position of the reference signal transmitted by the eNodeB;

each relay served by the eNodeB has a different relay physical cell identity, and the time-frequency resource position of the reference signal of each relay is the same; and the relay physical cell identity is used during a communication process between the relay and a user equipment.

The methods for acquiring the dedicated control channel resource region used by the relay include but are not limited to:

receiving, by the eNodeB, at least one optimum resource position set reported by the relay, where the optimum resource position set is acquired after the relay measures downlink channel conditions; and according to the optimum resource position sets reported by each relay and a priority level of each relay, allocating, by the eNodeB, a dedicated control channel resource region for each relay, or receiving, by the eNodeB, downlink channel information fed back by the relay, and then according to the priority level of each relay, allocating a dedicated control channel resource region for each relay; or in a time division duplex radio communication system, acquiring, by the eNodeB, channel information through channel reciprocity, and then according to the priority level of each relay, allocating a dedicated control channel resource region for each relay.

The performing, by the eNodeB and the relay, transmission and updating of the backhaul link control channel at the normal communication stage includes:

according to the dedicated control channel resource region allocated for the relay, configuring, by the eNodeB, the backhaul link control channel of the relay in the control channel resource region corresponding to the relay, so that the relay detects the backhaul link control channel that is sent by the eNodeB in the corresponding control channel resource region allocated by the eNodeB for the relay.

The information of the backhaul link control channel includes but is not limited to:

update information about a position of the control channel resource region of the backhaul link of the relay;

update information about a size of the backhaul link control channel;

update information about a transmission format of the backhaul link control channel;

information about a downlink scheduling instruction update of the backhaul link of the relay;

information about a response signal ACK or NACK; and information about an uplink scheduling instruction update and a power control command update of the backhaul link of the relay.

Further, the method also includes:

judging, by the eNodeB, whether the control channel resource region of the backhaul link of the relay needs to be updated; and if the control channel resource region needs to be updated, transmitting information about the update of the control channel resource region of the backhaul link of the relay.

In the dedicated control channel resource region allocated by the eNodeB for the relay, the eNodeB configures the backhaul link control channel that is sent to the relay in continuous resources elements REs of one or more continuous physical resource blocks and then sends the control channel, where the continuous resource elements REs specifically are continuously distributed firstly in a time domain direction and then in a frequency domain direction, or firstly in the frequency domain direction and then in the time domain direction, until the continuous resource elements REs are capable of bearing all control channels that are sent to the relay.

Further, before the step of configuring, by the eNodeB, the backhaul link control channel of the relay in the resource region corresponding to the relay, the method also includes:

judging whether a backhaul link control channel for the current relay exists, and if the backhaul link control channel for the current relay exists, performing subsequent steps; and if the backhaul link control channel for the current relay does not exist, preferentially allocating, by the eNodeB, the control channel resource region of the current relay for data information transmission of the relay; or configuring a control channel of a backhaul link or data channel information of one or more other relays in the resource region corresponding to the current relay; or allocating the control channel resource region of the current relay to the UE for use.

When the eNodeB has a backhaul link control channel that is sent to the current relay, the eNodeB configures the backhaul link control channel of the relay in the control channel resource region of the current relay. If the eNodeB indicates that there is data channel information that is sent to the relay in the subframe, the data channel information is firstly configured in the remaining resource elements REs in the control channel resource region of the current relay.

If the remaining control channel resource region is not sufficient for configuring the data channel information of the relay, a part of the data channel information is configured in the remaining control channel resource region; the other part of the data channel information is configured in one or more other positions, and the one or more configuration positions corresponding to the other part of the data channel information is indicated in the control channel resource region.

The number of dedicated control channel resource regions allocated by the eNodeB for the relay served by the eNodeB is one or more. The control channel resource region is one or more continuous physical resources blocks allocated by the eNodeB for the relay and used preferentially by the relay.

To sum up, by allocating a dedicated resource region for the relay served by the eNodeB and thus according to the resource region allocated for the relay, the eNodeB configures the control channel of the relay in the resource region corresponding to the relay, which solves the transmission problem of a backhaul link control channel in an LTE-A relay system, so that a relay can receive control information sent by the eNodeB within a wider scope, and that the complexity of blind detection of the relay is decreased.

In order to describe the method according to the embodiment of the present invention in detail, reference is made to the following embodiment:

Embodiment 2

In order to solve the transmission problem of a backhaul link control channel in an LTE-A relay system, so that a relay can receive control information sent by an eNodeB within a wider scope and that the complexity of blind detection of the relay is decreased, an embodiment of the present invention provides a method for implementing transmission of a backhaul link control channel in a relay system, where the method mainly includes an initial configuration stage and a normal communication stage, which are respectively described as follows.

I. Initial Configuration Stage

First stage: It mainly means that in a normal subframe, a configuration of a basic parameter of a backhaul link control channel is completed between the eNodeB and each relay, referring to FIG. 3, which is described in detail below.

101: In an eNodeB cell, the relay listens to downlink synchronization signals (including a primary synchronization signal and a secondary synchronization signal) and a physical broadcast channel (PBCH, Physical Broadcast Channel) that are sent by the eNodeB.

102: Perform carrier synchronization, radio frame synchronization, and symbol synchronization according to the listened downlink synchronization signals.

103: The relay acquires such information as a physical cell identity (Physical Cell Identity, hereinafter referred to as Cell ID), a cell antenna configuration, a cell bandwidth configuration, and a cyclic prefix length of the eNodeB macro cell.

The physical cell identity CELL ID is used for uniquely identifying the macro cell serving the relay.

104: The relay initiates random access to the eNodeB through a physical random access channel (PRACH, Physical Random Access Channel) and completes a cell access process according to a random access procedure between the relay and the eNodeB to implement uplink synchronization.

105: The eNodeB and the relay complete the configuration of basic control information of the backhaul link, which specifically includes:

completing, by the eNodeB and the relay, the configuration of the basic control information of the backhaul link through a physical downlink control format indicator channel (PCFICH, Physical control format indicator channel), a physical downlink control channel (PDCCH) and/or a physical downlink shared channel (PDSCH), or a physical uplink shared channel (PUSCH, Physical Uplink Control Channel) and/or a physical uplink control channel (PUCCH, Physical Uplink Control Channel).

The configured basic control information of the backhaul link includes:

(I) configuration information of an MBSFN subframe used by the relay where, the methods for exchanging the configuration information of the MBSFN subframe include but are not limited to: first method: the eNodeB configures MBSFN subframe information that may be used by each relay in the cell and sends the configuration information to the corresponding relay; and second method: each relay sends respective MBSFN subframe configuration information to the eNodeB, where the configuration of each relay may be the same or different.

(II) a physical cell identity (PCID, Physical Cell Identity) of the relay where, when allocating the PCID of each relay, the eNodeB should ensure that the reference symbol sent by the relay and the reference symbol sent by the eNodeB are orthogonal at a frequency domain position, so as to reduce mutual interference.

(III) information about a relay-specific control channel (RSCR, Relay-Specific Control Region) time-frequency resource region and information about a used modulation and coding scheme where, the methods for acquiring information about a control channel resource region of a relay include but are not limited to: first method: the relay measures downlink channel conditions and then reports several optimum resource position sets to the eNodeB; according to the optimum resource position sets reported by each relay in conjunction with such information as a priority level of each relay and user, the eNodeB determines the information about the specific control channel resource region ("control channel region" for short) and the used modulation and coding scheme of each relay and sends such information to the relay; second method: the relay feeds back downlink channel information to the eNodeB, and the eNodeB schedules the control channel of each relay and sends the control channel to the relay; and third method: the eNodeB acquires the channel information through channel reciprocity (that is, the eNodeB may acquire information about the status of a downlink channel according to information about the status of an uplink channel), and then determines and sends the control channel of each relay, where this method is mainly suitable for a TDD (Time Division Duplex, time division duplex) system.

Figure 4:
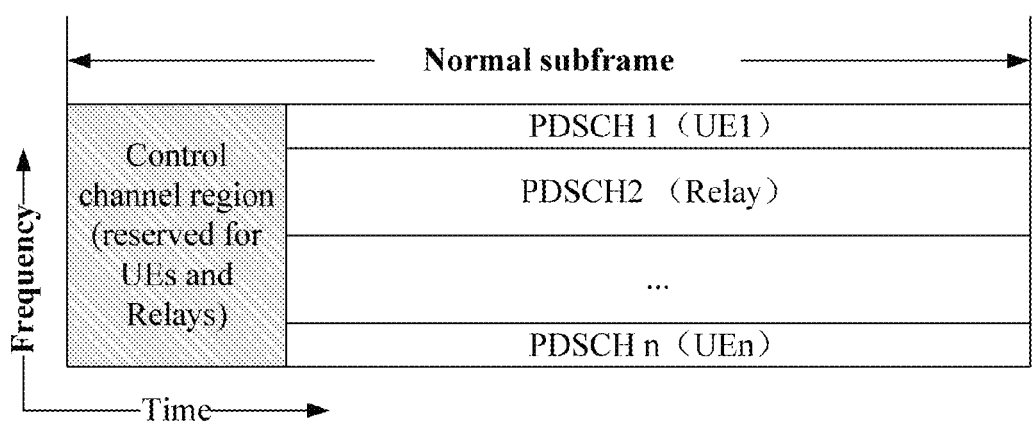
FIG. 4 is a schematic diagram of a configuration of basic parameters of a backhaul link control channel between an eNodeB and a relay in a normal subframe according to an Embodiment 2 of the present invention.

For ease of description, FIG. 4 is a schematic diagram of a configuration of basic parameters of a backhaul link control channel between an eNodeB and a relay in a normal subframe according to an embodiment of the present invention. As shown in FIG. 4, in the normal subframe, the configuration of the basic parameter of the backhaul link control channel is completed between the eNodeB and each relay, where the first several OFDM symbols of the normal subframe are control channel regions reserved for UEs and relays, and in the remaining OFDM symbols of the normal subframe, respective control channels are allocated for different UEs and relays. As shown in FIG. 4, PDSCH1 is configured for the UE1, PDSCH2 is configured for the Relay1, . . . , PDSCHn is configured for the UE2.

After completing the configuration of the basic parameters of the backhaul link control channel between the eNodeB and each relay in the above first stage, the embodiment proceeds to the normal communication stage, and the contents are as follows.

Figure 5:
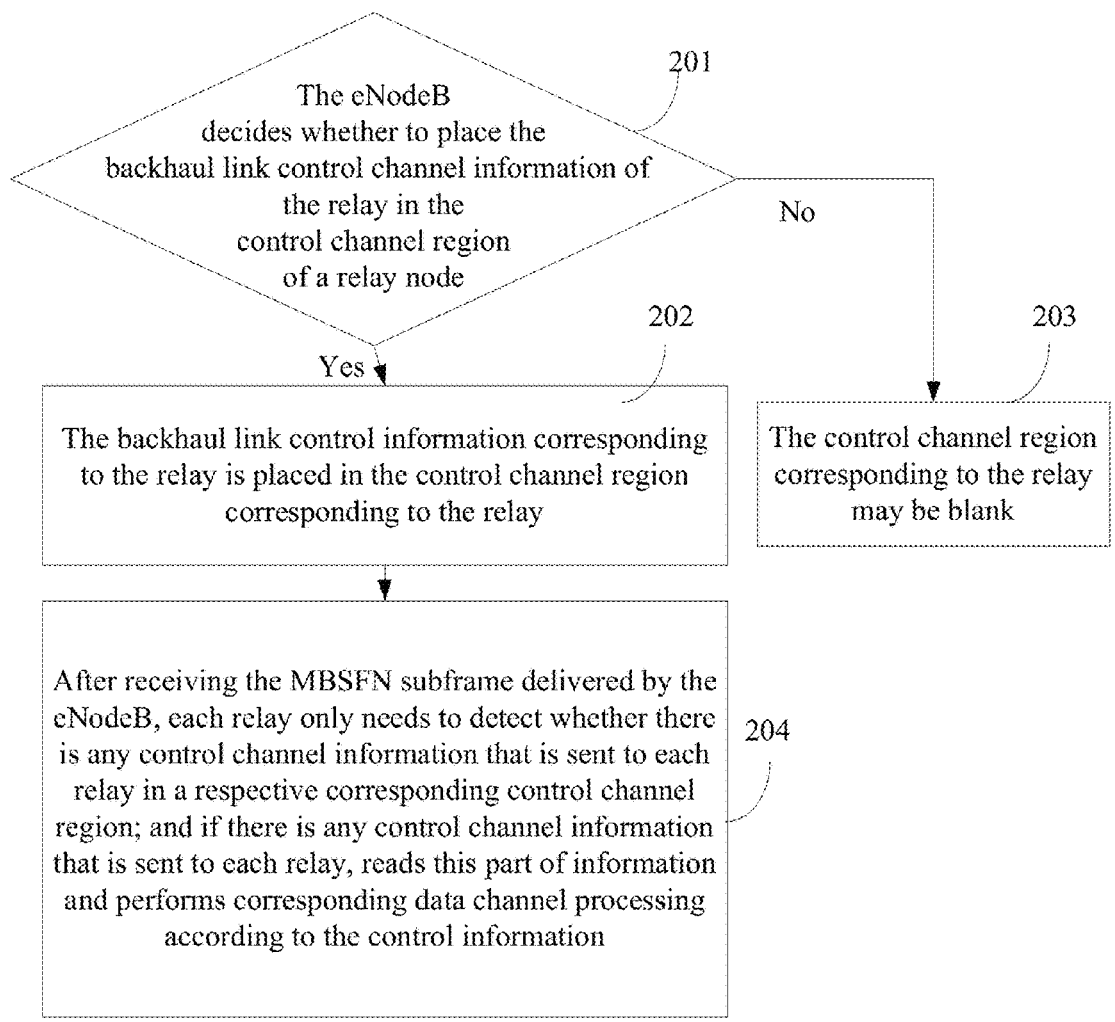
FIG. 5 is a schematic flow chart of a normal communication stage of a method for implementing transmission of a backhaul link control channel in a relay system according to an Embodiment 2 of the present invention.

Second stage: in the MBSFN subframes of the relay, the eNodeB and a relay node complete the sending and receiving of the backhaul link control channel, referring to FIG. 5, which is described in detail below.

201: According to scheduling information, the eNodeB decides whether to place the backhaul link control channel that is sent to the relay in the control channel region of a relay node, and if the eNodeB decides to place the backhaul link control channel that is sent to the relay in the control channel region of a relay node, performs to step 202; and if the eNodeB decides not to place the control of the backhaul link that is sent to the relay in the control channel region of a relay node, performs step 203.

202: The eNodeB places the control information of the backhaul link corresponding to the relay in the control channel region corresponding to the relay.

The main content of the backhaul control channel that is sent to the relay includes the following: (I) information about an update of the control channel resources of the backhaul link of the relay and a modulation and coding scheme, including an indicator about whether the control channel resource position specific to the relay is updated and an indicator about whether the modulation and coding scheme is updated, and if there is any update, the new indicator information should be included; (II) information about a downlink scheduling update of the backhaul link, including a data channel resource position, the number of HARQ (Hybrid Automatic Repeat Request, hybrid automatic repeat request) processes, a modulation and coding scheme (MCS, Modulation and Coding Scheme), a redundancy version (RV), a downlink resource indicator, a new data indicator, mapping information of transport blocks and codewords, precoding information, and so on; (III) information about ACK/NACK; and (IV) an uplink scheduling instruction update and a power control command update of the backhaul link, including information about whether uplink data scheduling information, region information and modulation and coding information of an uplink control channel, power control information, channel quality measurement indicator information exist.

203: If the eNodeB decides not to place the control of the backhaul link that is sent to the relay in the control channel region of a relay node, the control channel region corresponding to the relay may be blank.

If there is no channel information that is sent to the relay in the current subframe, in order to improve transmission efficiency, optionally the control channel region corresponding to the relay may also be reserved for other UEs or relays.

204: After the relay receiving the MBSFN subframe delivered by the eNodeB, each relay only needs to detect whether there is any control channel that is sent to each relay in a respective corresponding control channel region; and if there is any control channel, reads this part of information and performs corresponding data channel processing according to the control information.

Figure 6:
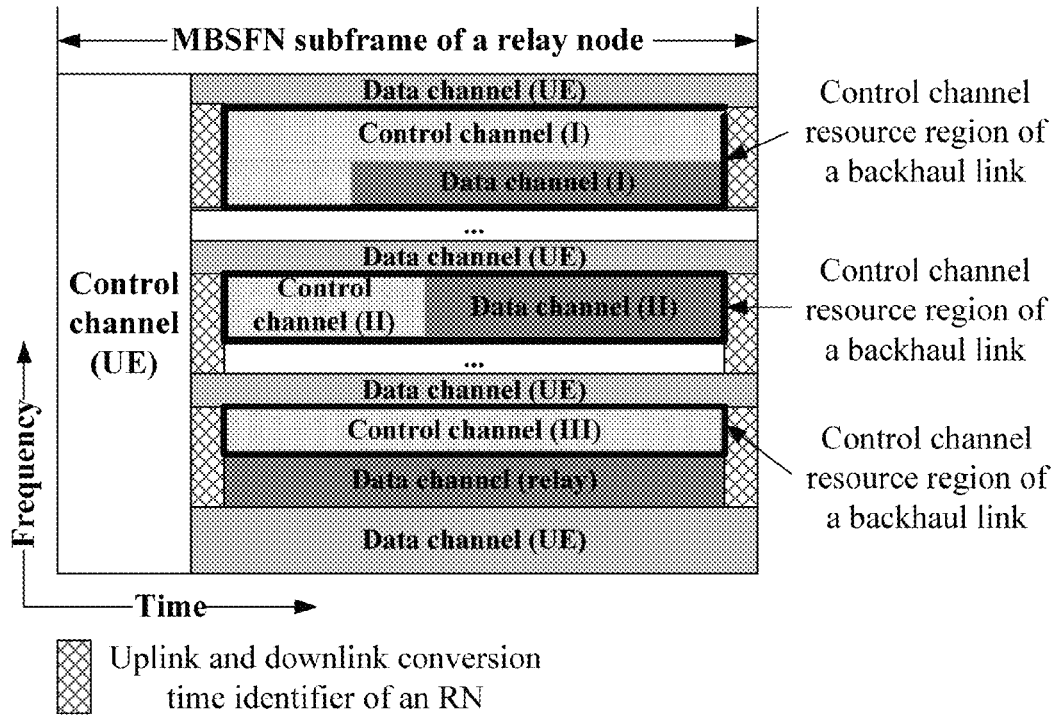
FIG. 6 is a schematic diagram of a configuration of a control channel between an eNodeB and a relay in an MBSFN subframe according to an Embodiment 2 of the present invention.

FIG. 6 is a schematic diagram of a configuration of a control channel between an eNodeB and a relay in an MBSFN subframe according to an embodiment of the present invention. As shown in FIG. 6, the first several OFDM symbols of the MBSFN subframe are control channel regions reserved for UEs, and the remaining OFDM symbols in the MBSFN subframe include three types of control channel regions: a control channel region corresponding to relay 1, where in the allocated physical resource block PRB (Physical Resource Block, physical resource block), a control channel that is sent to the relay is firstly mapped to a resource element in a frequency domain direction and then mapped to resource elements REs in a time domain direction, until all control channels that are sent to the relay in the subframe are configured; a control channel region corresponding to relay 2, where in the allocated physical resource blocks RBs, a control channel that is sent to the relay is firstly mapped to resource elements in the time domain direction and then mapped to resource elements REs in the frequency domain direction, until all control channels sent to the relay in the subframe are configured; and a control channel region corresponding to relay 3, where with respect to control channels that are sent to the relay, all control channels need to be mapped to all physical resources elements of the allocated physical resource block PRB. The embodiment of the present invention does not limit the three types of control channel regions in any way, and when the embodiment is implemented, the control channel regions are configured according to specific needs of the system.

Further, if in the backhaul link control channel that is sent to the current relay, the eNodeB indicates that there is data channel information that is sent to the relay in the subframe, the data channel information is firstly configured in the remaining resource elements REs of the control channel resource region of the current relay, as described in detail below.

For relay 1 or relay 2, if there is data channel information that is sent to the relay in the subframe, the eNodeB configures the data channel information in the configured end position after the control channel of the relay is configured in the control channel region corresponding to the relay.

To sum up, with the method provided by the embodiment of the present invention, the eNodeB allocates for each relay a dedicated optimum resource position that is most suitable for the quality of the backhaul link between the eNodeB and the relay, and accordingly, each relay only needs to blindly detect control information thereof in the pre-allocated optimum resource region, which reduces the number of time-frequency resources to be detected, thereby overcoming the calculation complexity of the blind detection of the prior art. Moreover, transmitting control information of any relay by using optimum time-frequency resources that are suitable for its current backhaul link channel conditions may greatly improve performance.

Embodiment 3

Figure 7:
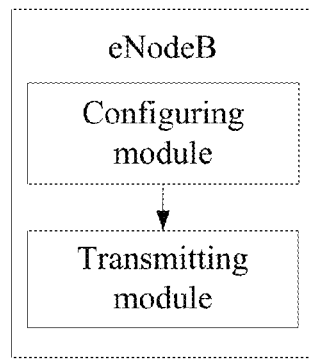
FIG. 7 is a schematic diagram of an eNodeB for implementing transmission of a backhaul link control channel in a relay system according to an Embodiment 3 of the present invention.

In order to solve the transmission problem of a backhaul link control channel in an LTE-A relay system, so that a relay can receive control information sent by an eNodeB within a wider scope, and that the complexity of blind detection of the relay is decreased, an embodiment of the present invention provides an eNodeB, where the eNodeB is configured to implement transmission of a backhaul link control channel in a relay system. Referring to FIG. 7, the eNodeB includes:

a configuring module, configured to complete, at an initial configuration stage, a configuration of initial information of a backhaul link control channel between the eNodeB and each relay served by the eNodeB; and a transmitting module, configured to perform, at a normal communication stage, transmission and updating of the backhaul link control channel with the relay through a dedicated control channel resource region allocated for each relay.

Further, the configuring module also includes:

a sending unit, configured to send a physical downlink shared channel PDSCH to each relay at the initial configuration stage, where the physical downlink shared channel is used for bearing initial information of the backhaul link control channel sent to each relay.

When configuring the initial information of the backhaul link control channel, the configuring module includes:

a first configuring unit, adapted to configure configuration information of an MBSFN subframe used by the relay;

a second configuring unit, adapted to configure a relay physical cell identity used by the relay; and a third configuring unit, adapted to configure information of the dedicated control channel resource region used by the relay.

The second configuring unit is specifically configured to allocate a relay physical cell identity for the relay at the initial configuration stage, where the relay physical cell identity is used for uniquely identifying the relay; and the control channel resource region and the relay physical cell identity have a mapping relationship.

Accordingly, the eNodeB also includes:

a notifying module, configured to notify the relay of the allocated relay physical cell identity and the information of the allocated dedicated control channel resource region, so that the relay searches for the corresponding control channel resource region according to the relay physical cell identity.

Further, when allocating the dedicated control channel resource region used by the relay, the eNodeB also includes:

a first allocating module, configured to receive at least one optimum resource position set reported by the relay, where the optimum resource position set is acquired after the relay measures downlink channel conditions; and according to the optimum resource position sets reported by each relay and a priority level of each relay, the eNodeB allocates the dedicated control channel resource region of each relay; or a second allocating module, configured to receive downlink channel information fed back by the relay, and then according to the priority level of each relay, allocate the dedicated control channel resource region of each relay; or a third allocating module, configured to acquire channel information by channel reciprocity in a time division duplex radio communication system, and then according to the priority level of each relay, allocate the dedicated control channel resource region of each relay.

The transmitting module includes:

a transmitting unit, adapted to configure, according to the dedicated control channel resource region allocated for the relay, the backhaul link control channel of the relay in the control channel resource region corresponding to the relay, so that the relay detects the backhaul link control channel sent by the eNodeB in the corresponding control channel resource region allocated by the eNodeB for the relay.

The backhaul link control channel includes but is not limited to:

information about an update of the control channel resource region of the backhaul link of the relay and the modulation and coding scheme used for the channel information;

information about a downlink scheduling update of the backhaul link of the relay;

information about a response signal ACK or NACK; and information about an uplink scheduling instruction update and a power control command update of the backhaul link of the relay.

Further, the eNodeB also includes:

an updating module, configured to judge whether the control channel resource region of the backhaul link of the relay needs to be updated; and if the control channel resource region needs to be updated, transmit information about the update of the control channel resource region of the backhaul link of the relay.

The transmitting unit is specifically adapted to configure, in the dedicated control channel resource region allocated by the eNodeB for the relay, the backhaul link control channel sent to the relay in continuous resource elements REs of one or more continuous physical resource blocks and then send the control channel, where the continuous resource elements REs specifically are continuously distributed firstly in a time domain direction and then in a frequency domain direction, or firstly in the frequency domain direction and then in the time domain direction, until the continuous resource elements REs are capable of bearing all control channels that are sent to the relay.

Further, the eNodeB also includes:

a judging module, configured to judge whether there is a backhaul link control channel for the current relay; and a processing module, configured to perform subsequent steps when a judgment result of the judging module is that there is a backhaul link control channel for the current relay; when the judgment result of the judging module is that there is a backhaul link control channel for the current relay, preferentially allocate the control channel resource region of the current relay for data information transmission of the relay; or configure control channels of backhaul links or data channel information of other relays in the resource region corresponding to the current relay; or allocate the control channel resource region of the current relay to a UE for use.

The transmitting unit also includes a configuring unit, configured to firstly configure the data channel information in the remaining resource elements REs of the control channel resource region of the current relay, if in the backhaul link control channel that is sent to the current relay, the eNodeB indicates that there is data channel information that is sent to the relay in the subframe.

To sum up, the eNodeB provided by the embodiment of the present invention allocates for each relay a dedicated optimum resource position (that is, the control channel resource region of each relay) that is most suitable for the quality of the backhaul link between the eNodeB and the relay, and accordingly, each relay only needs to blindly detect its own control information in the pre-allocated optimum resource region, which reduces the number of time-frequency resources to be detected, thereby overcoming the calculation complexity of the blind detection of the prior art. Moreover, transmitting control information of any relay by using optimum resources that are suitable for its current backhaul link channel conditions may greatly improve performance.

Embodiment 4

Figure 8:
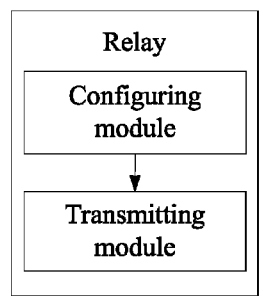
FIG. 8 is a schematic diagram of a relay for implementing transmission of a backhaul link control channel in a relay system according to an Embodiment 4 of the present invention.

In order to solve the transmission problem of a backhaul link control channel in an LTE-A relay system, so that a relay can receive control information sent by an eNodeB within a wider scope and that the complexity of blind detection of the relay is decreased, an embodiment of the present invention provides a relay, where the relay is configured to implement transmission of a backhaul link control channel in a relay system. Referring to FIG. 8, the relay includes:

a configuring module, configured to complete, at an initial configuration stage, a configuration of initial information of a backhaul link control channel with an eNodeB; and a transmitting module, configured to perform, at a normal communication stage, transmission and updating of the backhaul link control channel with the eNodeB through a dedicated control channel resource region allocated by the eNodeB for each relay.

Further, the configuring module of the relay also includes:

a receiving unit, configured to receive, at the initial configuration stage, a physical downlink shared channel PDSCH sent by the eNodeB, where the physical downlink shared channel is used for bearing initial information of the backhaul link control channel that is sent to each relay.

Further, the receiving unit is also configured to receive a relay physical cell identity allocated by the eNodeB for the relay and notify the relay of the information of the allocated dedicated control channel resource region, where the relay physical cell identity is used for uniquely identifying the relay; the control channel resource region and the relay physical cell identity have a mapping relationship, so that the relay searches for the corresponding control channel resource region according to the relay physical cell identity.

Further, the configuring module also includes:

a first reporting unit, configured to report at least one optimum resource position set which is acquired after the relay measures downlink channel conditions, so that the eNodeB allocates the dedicated control channel resource region of each relay according to the optimum resource position set reported by each relay and a priority level of each relay; or a second reporting unit, configured to feed back the downlink channel information to the eNodeB, so that the eNodeB allocates the dedicated control channel resource region of each relay according to the priority level of each relay.

The transmitting module includes:

a transmitting unit, configured to detect the backhaul link control channel sent by the eNodeB in the corresponding control channel resource region allocated by the eNodeB for itself.

To sum up, with the relay provided by the embodiment of the present invention, the eNodeB allocates for each relay a dedicated optimum resource position that is most suitable for the quality of the backhaul link between the eNodeB and the relay, and accordingly, each relay only needs to blindly detect control information thereof in the pre-allocated optimum resource region, which reduces the number of time-frequency resources to be detected, thereby overcoming the calculation complexity of the blind detection of the prior art. Moreover, transmitting control information of any relay by using optimum resources that are suitable for its current backhaul link channel conditions may greatly improve the performance.

Embodiment 5

Figure 9:
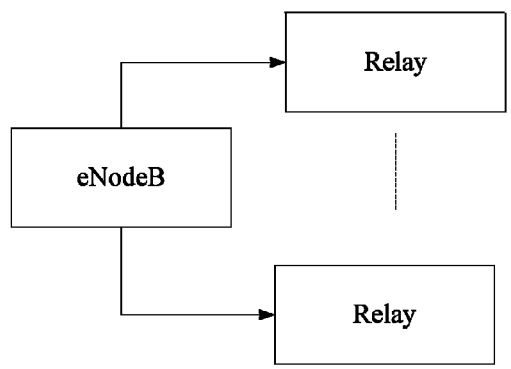
FIG. 9 is a schematic diagram of a system for implementing transmission of a backhaul link control channel in a relay system according to an Embodiment 5 of the present invention.

In order to solve the transmission problem of a backhaul link control channel in an LTE-A relay system, so that a relay can receive control information sent by an eNodeB within a wider scope, and that the complexity of blind detection of the relay is decreased, an embodiment of the present invention provides a system for implementing transmission of a backhaul link control channel in a relay system. Referring to FIG. 9, the system includes: an eNodeB and multiple relays.

The eNodeB is configured to complete, at an initial configuration stage, configuration of initial information of a backhaul link control channel with each relay served by the eNodeB; and at a normal communication stage, perform transmission and updating of the backhaul link control channel with the relay through a dedicated control channel resource region allocated for each relay.

The relays are configured to complete, at the initial configuration stage, the configuration of the initial information of the backhaul link control channel with the eNodeB; and at the normal communication stage, perform the transmission and updating of the backhaul link control channel with the eNodeB through the dedicated control channel resource region allocated for each relay.

Further, the eNodeB is also configured to send a physical downlink shared channel PDSCH to each relay at the initial configuration stage, where the physical downlink shared channel is used for bearing initial information of a backhaul link control channel of each relay.

When the eNodeB configures the initial information of the control channels of the backhaul links, the eNodeB is specifically adapted to configure configuration information of a multicast broadcast single frequency network MBSFN subframe used by the relays; configure relay physical cell identities used by the relays; and allocate information of the dedicated control channel resource regions used by the relays.

After the eNodeB configures the relay physical cell identity used by the relay, the eNodeB is also configured to notify the relays of the allocated relay physical cell identity and the allocated dedicated control channel resource region, where the relay physical cell identity is used for uniquely identifying the relay; and the control channel resource region and the relay physical cell identity have a mapping relationship, so that the relay searches for the corresponding control channel resource region according to the relay physical cell identity.

When the eNodeB allocates the dedicated control channel resource region used by the relay, the eNodeB is also configured to receive at least one optimum resource position set reported by the relay, where the optimum resource position sets are acquired after the relay measures downlink channel conditions; according to the optimum resource position sets reported by the relay and the priority level of the relay, the eNodeB allocates a dedicated control channel resource region for each relay; or the eNodeB is also configured to receive downlink channel information fed back by the relay, and then according to the priority level of the relay, allocate a dedicated control channel resource region for each relay; or the eNodeB is also configured to acquire channel information by channel reciprocity in a time division duplex radio communication system, and then according to the priority level of the relay, allocate the dedicated control channel resource region of each relay.

At the normal communication stage, the eNodeB is specifically adapted to configure, according to the dedicated control channel resource regions allocated for the relays, the control channels of the backhaul links of the relays in the control channel resource regions corresponding to the relays, so that the relays detect the control channels of the backhaul links sent by the eNodeB in the corresponding control channel resource regions allocated by the eNodeB for the relays.

The control channels of backhaul links include but are not limited to:

information about an update of the control channel resource regions of the backhaul links of the relays and the modulation and coding scheme used for the channel information;

information about a downlink scheduling update of the backhaul links of the relays;

information about a response signal ACK or NACK; and information about an uplink scheduling instruction update and a power control command update of the backhaul links of the relays.

Further, the eNodeB is also configured to judge whether the control channel resource regions of the backhaul links of the relays need to be updated; and if the control channel resource regions need to be updated, transmit the information about the update of the control channel resource regions of the backhaul links of the relays.

At the normal communication stage, the eNodeB is specifically adapted to configure, in the dedicated control channel resource regions allocated by the eNodeB for the relays, the control channels of the backhaul links that are sent to the relays in continuous resource elements REs of one or more continuous physical resource blocks PRBs and then send the control channels of the backhaul links, where the continuous resource elements REs specifically are continuously distributed firstly in a time domain direction and then in a frequency domain direction, or firstly in the frequency domain direction and then in the time domain direction, until the continuous resource elements REs are capable of bearing all control channels that are sent to the relays.

At the normal communication stage, the eNodeB is also configured to judge whether there is a backhaul link control channel for the current relay, and if there is a backhaul link control channel for the current relay, perform subsequent steps; if there is no backhaul link control channel for the current relay, the eNodeB preferentially allocates the control channel resource region of the current relay for data information transmission of the relay; or configures control channels of backhaul links or data channel information of other relays in the resource region corresponding to the current relay; or allocates the control channel resource region of the current relay to a UE for use.

If the information of the dedicated control channel resource regions allocated by the eNodeB to the relays is semi-static or semi-persistent, starting from the reception of the information of the control channel resource regions, the relays consider that the control channel resource information in the control channel resource regions remains unchanged, until update information about the information of the control channel resource regions is acquired.

To sum up, in the system provided by the embodiment of the present invention, the eNodeB allocates for each relay a dedicated optimum resource position that is most suitable for the quality of the backhaul link between the eNodeB and the relay, and accordingly, each relay only needs to blindly detect its own control information in the pre-allocated optimum resource region, which reduces the number of time-frequency resources to be detected, thereby overcoming the calculation complexity of the blind detection of the prior art. Moreover, transmitting control information of any relay by using optimum resources that are suitable for its current backhaul link channel conditions may greatly improves the performance.

To sum up, the technical solution provided by the embodiment of the present invention implements transmission of a backhaul link control channel in a relay system through an initial configuration stage and a normal communication stage between the eNodeB and relays, where at the initial configuration stage, the eNodeB notifies the relays of some key configuration information, and meanwhile acquires from the relays some key configuration information about the communication between the relays and UEs, and the eNodeB notifies the relays of Cell IDs to be used when the relays communicate with UEs; and at the normal communication stage, by notifying the relays of some key configuration information and according to such factors as link quality between the eNodeB and the relays and the priorities of the relays relative to each other, the eNodeB selects for each relay an optimum physical resource position or set for transmission of control signaling, a physical resource size or set, a physical transmission format or set and other parameters, and sends the parameter information to corresponding relay nodes; and the control signaling between the eNodeB and the relays is transmitted by using these specific positions of control channels of backhaul links, sets of occupied resource sizes, and transmission formats. Those skilled in the art may know that the technical solution provided by the embodiment of the present invention not only may be applied in an LTE-A relay system, but also may be considered to be applied in other radio communication systems that use relay technologies, such as a WIMAX (Worldwide Interoperability for Microwave Access, that is, worldwide interoperability for microwave access) system.

The present invention provides a method for implementing transmission of a backhaul link control channel in a relay system, where the method includes an initial configuration stage and a normal communication stage.

At the initial configuration stage, a configuration of initial information of a backhaul link control channel is completed between an eNodeB and each relay served by the eNodeB.

At the normal communication stage, the eNodeB and the relay perform transmission and updating of the backhaul link control channel through a dedicated control channel resource region allocated for each relay.

The performing, by the eNodeB and the relay, the transmission and updating of the backhaul link control channel at the normal communication stage includes:

according to the dedicated control channel resource region allocated for the relay, configuring, by the eNodeB, the backhaul link control channel of the relay in the control channel resource region corresponding to the relay, so that the relay detects the backhaul link control channel sent by the eNodeB in the corresponding control channel resource region allocated by the eNodeB for the relay.

The backhaul link control channel includes but is not limited to:

update information about a position of the control channel resource region of the backhaul link of the relay; update information about a size of the backhaul link control channel; update information about a transmission format of the backhaul link control channel; information about a downlink scheduling update of the backhaul link of the relay; information about a response signal ACK or NACK; and information about an uplink scheduling instruction update and a power control instruction update of the backhaul link of the relay.

At the initial configuration stage, the eNodeB sends a physical downlink shared channel PDSCH to each relay, where the physical downlink shared channel is used for bearing initial information of the backhaul link control channel that is sent to each relay. The initial information of the backhaul link control channel includes:

configuration information of a multicast broadcast single frequency network MBSFN subframe used by the relay; a relay physical cell identity used by the relay; position information of the dedicated control channel resource region used by the relay, a size of the backhaul link control channel, and information about a transmission format of the control channel.

At the initial configuration stage, the eNodeB allocates the relay physical cell identity for the relay, where the relay physical cell identity is used for uniquely identifying the relay; the control channel resource region and the relay physical cell identity have a mapping relationship; the eNodeB notifies the relay of the allocated relay physical cell identity and the information about the allocated dedicated control channel resource region, so that the relay searches for the corresponding control channel resource region according to the relay physical cell identity.

The relay physical cell identity is used for uniquely identifying each relay served by the eNodeB; the time-frequency resource position of the reference signal transmitted by the relay, which is inferred, according to the relay physical cell identity of the relay, is different from the frequency domain position of the reference signal transmitted by the eNodeB; each relay served by the eNodeB has a different relay physical cell identity, and the time-frequency resource position of the reference signal of each relay is the same; and the relay physical cell identity is used during a communication process between the relay and a user equipment.

The methods for acquiring the dedicated control channel resource region used by the relay include but are not limited to the following:

the eNodeB receives at least one optimum resource position set reported by the relay, where the optimum resource position set is acquired after the relay measures downlink channel conditions; according to the optimum resource position set reported by each relay and a priority level of each relay, the eNodeB allocates a dedicated control channel resource region for each relay; or the eNodeB receives the downlink channel information fed back by the relay, and then according to the priority level of each relay, allocates a dedicated control channel resource region for each relay; or in a time division duplex radio communication system, the eNodeB acquires channel information by channel reciprocity, and then according to a priority level of each relay, allocates a dedicated control channel resource region for each relay.

Further, the eNodeB judges whether the control channel resource region of the backhaul link of the relay needs to be updated; and if the control channel resource region needs to be updated, transmits the information about the update of the control channel resource region of the backhaul link of the relay.

The eNodeB allocates one or more dedicated control channel resource regions for each relay.

Specifically, the dedicated control channel resource region specifically is:

one or more continuous physical resource blocks allocated by the eNodeB for the relay and used preferentially by the relay. In the dedicated control channel resource region allocated by the eNodeB for the relay, the eNodeB configures the backhaul link control channel sent to the relay in continuous resource elements REs of one or more continuous physical resource blocks and then sends the control channel, where the continuous resource elements REs specifically are continuously distributed firstly in a time domain direction and then in a frequency domain direction, or firstly in the frequency domain direction and then in the time domain direction, until the continuous resource elements REs are capable of bearing all control channels that are sent to the relay.

Further, before the step of configuring, by the eNodeB, the backhaul link control channel of the relay in the resource region corresponding to the relay, the method also includes:

judging whether there is a backhaul link control channel for the current relay, and if there is a backhaul link control channel for the current relay, performing subsequent steps; if there is no backhaul link control channel for the current relay, preferentially allocating the control channel resource region of the current relay for data information transmission of the relay; or configuring control channels of backhaul links or data channel information of other relays in the resource region corresponding to the current relay; or allocating the control channel resource region of the current relay to a UE. If in the backhaul link control channel that is sent to the current relay, the eNodeB indicates that there is data channel information that is sent to the relay in the subframe, the data channel information is firstly configured in the remaining resource elements REs of the control channel resource region of the current relay.

An embodiment of the present invention further provides an eNodeB, where the eNodeB is configured to implement transmission of a backhaul link control channel in a relay system, and the eNodeB includes:

a configuring module, configured to complete, at an initial configuration stage, a configuration of initial information of a backhaul link control channel between the eNodeB and each relay served by the eNodeB; and a transmitting module, configured to perform, at a normal communication stage, transmission and updating of the backhaul link control channel with the relay through a dedicated control channel resource region allocated for each relay.

The transmitting module includes:

a transmitting unit, adapted to configure, according to the dedicated control channel resource region allocated for the relay, the backhaul link control channel of the relay in the control channel resource region corresponding to the relay, so that the relay detects the backhaul link control channel sent by the eNodeB in the corresponding control channel resource region allocated by the eNodeB for the relay.

Further, the configuring module also includes:

a delivering unit, configured to deliver a physical downlink shared channel to each relay at the initial configuration stage, where the physical downlink shared channel is used for bearing initial information of the backhaul link control channel sent to each relay.

Further, when configuring the initial information of the backhaul link control channel, the configuring module includes:

a first configuring unit, adapted to configure configuration information of a multicast broadcast single frequency network MBSFN subframe used by the relay;

a second configuring unit, adapted to configure a relay physical cell identity used by the relay; and a third configuring unit, adapted to configure information of a dedicated control channel resource region used by the relay.

The second configuring unit is specifically configured to allocate a relay physical cell identity for the relay at the initial configuration stage, where the relay physical cell identity is used for uniquely identifying the relay; and the control channel resource region and the relay physical cell identity have a mapping relationship.

Accordingly, the eNodeB also includes:

a notifying module, configured to notify the relay of the allocated relay physical cell identity and the information of the allocated dedicated control channel resource region, so that the relay searches for the corresponding control channel resource region according to the relay physical cell identity.

Further, when allocating the dedicated control channel resource region used by the relay, the eNodeB also includes:

a first allocating module, configured to receive at least one optimum resource position set reported by the relay, where the optimum resource position set is acquired after the relay measures downlink channel conditions; according to the optimum resource position set reported by each relay and a priority level of each relay, the eNodeB allocates a dedicated control channel resource region for each relay, or a second allocating module, configured to receive the downlink channel information fed back by the relay, and then according to the priority level of each relay, allocate a dedicated control channel resource region for each relay; or a third allocating module, configured to acquire channel information by channel reciprocity in a time division duplex radio communication system, and then according to the priority level of each relay, allocate the dedicated control channel resource region of each relay.

The backhaul link control channel includes but is not limited to:

update information about a position of the control channel resource region of the backhaul link of the relay; update information about a size of the backhaul link control channel; update information about a transmission format of the backhaul link control channel; information about a downlink scheduling update of the backhaul link of the relay; information about a response signal ACK or NACK; and information about an uplink scheduling instruction update and a power control command update of the backhaul link of the relay.

Further, the eNodeB also includes:

an updating module, configured to judge whether the control channel resource region of the backhaul link of the relay needs to be updated; and if the control channel resource region needs to be updated, transmit the information about the update of the control channel resource region of the backhaul link of the relay.

The transmitting unit is specifically adapted to configure, in the dedicated control channel resource region allocated by the eNodeB for the relay, the backhaul link control channel sent to the relay in continuous resource elements REs of one or more continuous physical resource blocks and then send the control channel, where the continuous resource elements REs specifically are continuously distributed firstly in a time domain direction and then in a frequency domain direction, or firstly in the frequency domain direction and then in the time domain direction, until the continuous resource elements REs are capable of bearing all control channels that are sent to the relay.

Further, the eNodeB also includes:

a judging module, configured to judge whether there is a backhaul link control channel for the current relay; and a processing module, configured to perform subsequent steps when a judgment result of the judging module is that there is a backhaul link control channel for the current relay; when the judgment result of the judging module is that there is no backhaul link control channel for the current relay, preferentially allocate the control channel resource region of the current relay for data information transmission of the relay; or configure control channels of backhaul links or data channel information of other relays in the resource region corresponding to the current relay; or allocate the control channel resource region of the current relay to a UE for use.

Further, the transmitting unit also includes: a configuring unit, configured to firstly configure the data channel information in the remaining resource elements REs of the control channel resource region of the current relay, if in the backhaul link control channel that is sent to the current relay, the eNodeB indicates that there is data channel information that is sent to the relay in the subframe.

An embodiment of the present invention further provides a relay, where the relay is configured to implement transmission of a backhaul link control channel in a relay system, and the relay includes:

a configuring module, configured to complete, at an initial configuration stage, a configuration of initial information of a backhaul link control channel with an eNodeB; and a transmitting module, configured to perform, at a normal communication stage, transmission and updating of the backhaul link control channel with the eNodeB through a dedicated control channel resource region allocated by the eNodeB for each relay.

The configuring module of the relay also includes:

a receiving unit, configured to receive, at the initial configuration stage, a physical downlink shared channel sent by the eNodeB, where the physical downlink shared channel is used for bearing initial information of the backhaul link control channel that is sent to each relay.

Further, the receiving unit is also configured to receive a relay physical cell identity allocated by the eNodeB for the relay and notify the relay of the information of the allocated dedicated control channel resource region, where the relay physical cell identity is used for uniquely identifying the relay; the control channel resource region and the relay physical cell identity have a mapping relationship, so that the relay searches for the corresponding control channel resource region according to the relay physical cell identity.

Further, the configuring module also includes:

a first reporting unit, configured to report at least one optimum resource position set which is acquired after the relay measures downlink channel conditions, so that the eNodeB allocates the dedicated control channel resource region of each relay according to the optimum resource position set reported by each relay and a priority level of each relay; or a second reporting unit, configured to feed back downlink channel information to the eNodeB, so that the eNodeB allocates the dedicated control channel resource region of each relay according to the priority level of each relay.

The transmitting module includes:

a transmitting unit, configured to detect the backhaul link control channel sent by the eNodeB in the corresponding control channel resource region allocated by the eNodeB for the relay.

An embodiment of the present invention further provides a system for implementing transmission of a backhaul link control channel in a relay system, where the system includes: an eNodeB and multiple relays.

The eNodeB is configured to complete, at an initial configuration stage, configuration of initial information of a backhaul link control channel with each relay served by the eNodeB; and at a normal communication stage, perform transmission and updating of the backhaul link control channel with the relay through a dedicated control channel resource region allocated for each relay.

The relays are configured to complete, at the initial configuration stage, the configuration of the initial information of the backhaul link control channel with the eNodeB; and at the normal communication stage, perform the transmission and updating of the backhaul link control channel with the eNodeB through the dedicated control channel resource region allocated for each relay.

Further, the eNodeB is also configured to send a physical downlink shared channel to each relay at the initial configuration stage, where the physical downlink shared channel is used for bearing initial information of a backhaul link control channel of each relay.

When the eNodeB configures the initial information of the control channels of the backhaul links, the eNodeB is specifically adapted to configure configuration information of a multicast broadcast shared network MBSFN subframe used by the relays; configure the relay physical cell identities used by the relays; and allocate the information about the dedicated control channel resource regions used by the relays.

Further, after the eNodeB configures the relay physical cell identities used by the relays, the eNodeB is also configured to notify the relays of the allocated relay physical cell identities and the information of the allocated dedicated control channel resource regions, where the relay physical cell identities are used for uniquely identifying the relays; and the control channel resource regions and the relay physical cell identities have a mapping relationship, so that the relays search for the corresponding control channel resource regions according to the relay physical cell identities.

Further, when the eNodeB allocates the dedicated control channel resource regions used by the relays, the eNodeB is also configured to receive at least one optimum resource position set reported by the relays, where the optimum resource position set is acquired after the relays measure downlink channel conditions; according to the optimum resource position sets reported by the relays and the priority levels of the relays, the eNodeB allocates the dedicated control channel resource region of each relay; or the eNodeB is configured to receive the downlink channel information fed back by the relays and then according to the priority levels of the relays, allocate the dedicated control channel resource region of each relay; or the eNodeB is configured to acquire channel information by channel reciprocity in a TDD radio communication system and then according to the priority levels of the relays, allocate the dedicated control channel resource region of each relay.

At the normal communication stage, the eNodeB is specifically adapted to configure, according to the dedicated control channel resource regions allocated for the relays, the control channels of the backhaul links of the relays in the control channel resource regions corresponding to the relays, so that the relays detect the control channels of the backhaul links sent by the eNodeB in the corresponding control channel resource regions allocated by the eNodeB for the relays.

The control channels of the backhaul links include but are not limited to:

update information about a position of the control channel resource regions of the backhaul links of the relays; update information about a size of the control channels of the backhaul links; update information about a transmission format of the control channels of the backhaul links; information about a downlink scheduling update of the backhaul links of the relays; information about a response signal ACK or NACK; and information about an uplink scheduling instruction update and a power control instruction update of the backhaul links of the relays.

Further, the eNodeB is also configured to judge whether the control channel resource regions of the backhaul links of the relays need to be updated; and if the control channel resource regions need to be updated, transmit the information about the update of the control channel resource regions of the backhaul links of the relays.

At the normal communication stage, the eNodeB is specifically adapted to configure, in the dedicated control channel resource regions allocated by the eNodeB for the relays, the control channels of the backhaul links sent to the relays in continuous resource elements REs of one or more continuous physical resource blocks and then send the control channels of the backhaul links, where the continuous resource elements REs specifically are continuously distributed firstly in a time domain direction and then in a frequency domain direction, or firstly in the frequency domain direction and then in the time domain direction, until the continuous REs are capable of bearing all control channels that are sent to the relays.

Further, at the normal communication stage, the eNodeB is also configured to judge whether there is a backhaul link control channel for the current relay, and if there is a backhaul link control channel for the current relay, perform subsequent steps; if there is no backhaul link control channel for the current relay, the eNodeB preferentially allocates the control channel resource region of the current relay for data information transmission of the relay; or configures control channels of backhaul links or data channel information of other relays in the resource region corresponding to the current relay; or allocates the control channel resource region of the current relay to a UE for use.

If the information of the dedicated control channel resource regions allocated by the eNodeB to the relays is semi-static or semi-persistent, starting from the reception of the information of the control channel resource regions, the relays consider that the information of the control channel resource regions remains unchanged, until update information about the information of the control channel resource regions is acquired.

The term "receiving" in the embodiments of the present invention may be either construed as actively acquiring information from other modules, or construed as receiving information sent by other modules.

Those skilled in the art may understand that the accompanying drawings are merely schematic diagrams of exemplary embodiments, and that the modules or processes in the accompanying drawings are not necessary in implementing the present invention.

Those skilled in the art may understand that the modules in an apparatus according to an embodiment may be distributed in the apparatus according to the embodiment as described in the embodiment, or may be presented in one or more apparatuses different from the embodiment. The modules of the above embodiments may be combined into one module or further divided into more submodules.

The sequence numbers of the embodiments of the present invention are used for description only and do not represent merits or demerits of the embodiments.

A part of steps of the embodiments of the present invention may be implemented by software, and the corresponding software programs may be stored in a readable storage medium, such as an optical disk or a hard disk.

Detailed above are merely exemplary embodiments of the present invention, and are not intended to limit the present invention. Any modification, equivalent substitution, and improvement within the spirit and principle of the present invention shall be included in the scope of the present invention.

What is claimed is:

1. A method for implementing transmission of a backhaul link control channel in a relay system, comprising:
    sending, by an eNodeB, initial information of the backhaul link control channel to each relay served by the eNodeB;
    completing an initial configuration of the backhaul link control channel between the eNodeB and each relay, wherein the initial configuration comprises configuring a dedicated control channel resource region for each relay; and
    performing, by the eNodeB and each relay, transmission and updating of control information of the backhaul link through the dedicated control channel resource region;
    wherein the initial information of the backhaul link control channel comprises:
        configuration information of a multicast broadcast single frequency network MBSFN subframe used by the relay;
        a relay physical cell identity used by the relay, wherein the relay physical cell identity used by the relay is allocated by the eNodeB to ensure that a reference symbol sent by the relay and a reference symbol sent by the eNodeB are orthogonal at a frequency domain position; and
        position information of the dedicated control channel resource region used by the relay, a size of the backhaul link control channel, and information about a transmission format of the control channel.

2. The method according to claim 1, wherein performing transmission and updating of control information of the backhaul link comprises:
    performing transmission of update information about a position of the control channel resource region of the backhaul link of the relay;
    performing transmission of update information about a size of the backhaul link control channel;
    performing transmission of update information about a transmission format of the backhaul link control channel;
    performing transmission of information about a downlink scheduling update of the backhaul link of the relay;
    performing transmission of information about a response signal ACK or NACK; and
    performing transmission of information about an uplink scheduling instruction update and a power control command update of the backhaul link of the relay.

3. The method according to claim 1, wherein the sending the initial information of the backhaul link control channel to each relay served by the eNodeB comprises:

sending, by the eNodeB, the initial information of the backhaul link control channel to the each relay served by the eNodeB through a physical downlink shared channel PDSCH.

4. The method according to claim 1, wherein the performing updating of control information of the backhaul link comprises:
judging, by the eNodeB, whether the control channel resource region of the backhaul link of the each relay needs to be updated, and if the control channel resource region needs to be updated, transmitting information about the update of the control channel resource region of the backhaul link of the each relay.

5. The method according to claim 1, wherein the dedicated control channel resource region configured for the each relay comprises:
one or more continuous physical resource blocks allocated by the eNodeB for the each relay and preferentially used by the each relay.

6. The method according to claim 5, wherein the one physical resource block or more continuous physical resource blocks allocated by the eNodeB for the each relay and preferentially used by the each relay comprise:
in the dedicated control channel resource region allocated by the eNodeB for the each relay, configuring, by the eNodeB, the backhaul link control channel of the each relay in continuous resource elements REs of the one or more continuous physical resource blocks, wherein the continuous resource elements REs specifically are continuously distributed firstly in a time domain direction and then in a frequency domain direction, or firstly in the frequency domain direction and then in the time domain direction, until the continuous resource elements REs are capable of bearing all control information sent to the relay.

7. The method according to claim 1, wherein the method further comprises:
if there is control information of the backhaul link that is sent to a current relay, performing transmission of the control information of the backhaul link; and
if there is no control information of the backhaul link that is sent to the current relay, preferentially allocating, by the eNodeB, the control channel resource region of the current relay for data information transmission of the relay; or configuring control channels of backhaul links or data channel information of other relays in the resource region corresponding to the current relay; or allocating the control channel resource region of the current relay to a UE for use.

8. The method according to claim 7, wherein the method further comprises:
in the backhaul link control channel that is sent to the current relay, if the eNodeB indicates that there is data channel information that is sent to the relay in a subframe, firstly configuring the data channel information in remaining Resource Elements REs of the control channel resource region of the current relay.

9. An eNodeB for implementing transmission of a backhaul link control channel in a relay system, wherein the eNodeB comprises:
a delivering unit, configured to deliver initial information of the backhaul link control channel to each relay served by the eNodeB;
a configuring module, configured to complete, according to the initial information sent by the delivering unit, an initial configuration of the backhaul link control channel between each relay and itself, wherein the initial configuration comprises configuring a dedicated control channel resource region for each relay; and
a transmitting module, configured to perform transmission and updating of control information of the backhaul link with each relay through the dedicated control channel resource region configured by the configuring module;
wherein the eNodeB further comprises:
a first configuring unit, adapted to configure configuration information of a multicast broadcast single frequency network MBSFN subframe used by the relay;
a second configuring unit, adapted to configure a relay physical cell identity used by the relay, wherein the relay physical cell identity used by the relay is allocated by the eNodeB to ensure that a reference symbol sent by the relay and a reference symbol sent by the eNodeB are orthogonal at a frequency domain position; and
a third configuring unit, adapted to configure information of the dedicated control channel resource region used by the relay, a size of the backhaul link control channel, and information about a transmission format of the control channel.

10. The eNodeB according to claim 9, wherein the transmitting module is specifically configured to:
perform transmission of update information about a position of the control channel resource region of the backhaul link of the relay;
perform transmission of update information about a size of the backhaul link control channel;
perform transmission of update information about a transmission format of the backhaul link control channel;
perform transmission of information about a downlink scheduling update of the backhaul link of the relay;
perform transmission of information about a response signal ACK or NACK; and
perform transmission of information about an uplink scheduling instruction update and a power control command update of the backhaul link of the relay.

11. The eNodeB according to claim 9, wherein the delivering unit is specifically configured to deliver the initial information of the backhaul link control channel to the each relay through a physical downlink shared channel PDSCH.

12. The eNodeB according to claim 9, wherein the eNodeB further comprises:
an updating module, configured to judge whether the control channel resource region of the backhaul link of the relay needs to be updated; and
the transmitting module, specifically configured to transmit the information about the update of the control channel resource region of the backhaul link of the relay if a judgment result of the updating module is that the control channel resource region of the backhaul link of the relay needs to be updated.

13. The eNodeB according to claim 9, wherein the dedicated control channel resource region configured by the configuring module specifically comprises one or more continuous physical resource blocks allocated for the each relay and preferentially used by the each relay; and
further comprises in the dedicated control channel resource region allocated for the relay, configuring, by the configuring module, the backhaul link control channel of the relay in continuous resource elements of the one or more continuous physical resource blocks, wherein the continuous resource elements REs specifically are continuously distributed firstly in a time domain direction and then in a frequency domain direction, or continuously distributed firstly in the frequency domain direction and then in the time domain direction, until the continuous resource elements are capable of bearing all control information that is sent to the relay.

14. The eNodeB according to claim 9, wherein the eNodeB further comprises:
   a judging module, configured to judge whether there is a backhaul link control channel for a current relay; and
   a processing module, configured to: when a judgment result of the judging module is that there is a backhaul link control channel for the current relay, perform transmission of control information of the backhaul link; or when the judgment result of the judging module is that there is no backhaul link control channel for the current relay, preferentially allocate the control channel resource region of the current relay for data information transmission of the relay; or when the judgment result of the judging module is that there is no backhaul link control channel for the current relay, configure backhaul link control channels or data channel information of other relays in the resource region that corresponds to the current relay; or when the judgment result of the judging module is that there is no backhaul link control channel for the current relay, allocate the control channel resource region of the current relay to a UE for use.

15. The eNodeB according to claim 9, wherein the transmitting module further comprises a fourth configuring unit, configured to firstly configure data channel information in remaining resource elements REs of the control channel resource region of a current relay; if in the backhaul link control channel that is sent to the current relay, the eNodeB indicates that there is data channel information that is sent to the relay in a subframe.

16. A relay for implementing transmission of a backhaul link control channel in a relay system, wherein the relay comprises:
   a receiving unit, configured to receive initial information, which is sent by an eNodeB, of a backhaul link control channel of each relay served by the eNodeB;
   a configuring module, configured to complete, according to the initial information received by the receiving unit, an initial configuration of the backhaul link control channel with the eNodeB and itself, wherein the initial configuration comprises configuring a dedicated control channel resource region for the each relay; and
   a transmitting module, configured to perform transmission and updating of control information of the backhaul link with the eNodeB through the dedicated control channel resource region configured by the configuring module;
   wherein the initial information of the backhaul link control channel comprises:
      configuration information of a multicast broadcast single frequency network MBSFN subframe used by the relay;
      a relay physical cell identity used by the relay, wherein the relay physical cell identity used by the relay is allocated by the eNodeB to ensure that a reference symbol sent by the relay and a reference symbol sent by the eNodeB are orthogonal at a frequency domain position; and
      position information of the dedicated control channel resource region used by the relay, a size of the backhaul link control channel, and information about a transmission format of the control channel.

17. The relay according to claim 16, wherein the receiving unit is specifically configured to receive a physical downlink shared channel PDSCH that is sent by the eNodeB, wherein the physical downlink shared channel is used for bearing initial information of the backhaul link control channel that is sent to the each relay.

18. The relay according to claim 16, wherein the configuring module further comprises:
   a first reporting unit, configured to report at least one optimum resource position set which is acquired after the relay measures downlink channel conditions, so that the eNodeB allocates the dedicated control channel resource region of the each relay according to the optimum resource position set reported by the each relay and a priority level of the each relay; or
   a second reporting unit, configured to feed back downlink channel information to the eNodeB so that the eNodeB allocates the dedicated control channel resource region of each relay according to the priority level of the each relay.

19. The relay according to claim 16, wherein the transmitting module comprises:
   a transmitting unit, configured to detect in the corresponding control channel resource region allocated by the eNodeB for the relay, the backhaul link control channel that is sent by the eNodeB.

20. The relay according to claim 16, wherein the control information comprises:
   update information about a position of the control channel resource region of the backhaul link of the relay;
   update information about a size of the backhaul link control channel;
   information about a downlink scheduling instruction update of the backhaul link of the relay;
   information about a response signal ACK or NACK; and
   information about an uplink scheduling instruction update and a power control command update of the backhaul link of the relay.

21. A non-transitory computer program product, comprising computer program code, which, when executed by a computer unit, will cause the computer unit to perform the method for implementing transmission of a backhaul link control channel in a relay system according to claim 1.

* * * * *